United States Patent [19]

Takahara et al.

[11] Patent Number: 4,961,773
[45] Date of Patent: Oct. 9, 1990

[54] APPARATUS FOR PROCESSING A MELTED GLASS STREAM INTO A MELTED GLASS LUMP OF A PREDETERMINED VOLUME

[75] Inventors: Hiroaki Takahara; Shigeru Asanuma, both of Tokyo, Japan

[73] Assignee: Hoya Corporation, Tokyo, Japan

[21] Appl. No.: 332,295

[22] Filed: Mar. 31, 1989

[30] Foreign Application Priority Data

Mar. 31, 1988 [JP] Japan .................................. 63-80124

[51] Int. Cl.$^5$ .............................................. C03B 9/46
[52] U.S. Cl. ....................................... 65/174; 65/332; 65/334; 83/555; 83/623
[58] Field of Search ................. 65/174, 175, 332, 334; 83/623, 563, 555

[56] References Cited

U.S. PATENT DOCUMENTS

| | | | |
|---|---|---|---|
| 1,576,734 | 3/1926 | Ferngren | 65/334 X |
| 3,193,926 | 7/1965 | Honiss | 65/334 UX |
| 3,677,732 | 7/1972 | Dornan | 65/334 X |
| 4,467,431 | 8/1984 | Gardner et al. | 65/174 X |

*Primary Examiner*—Robert L. Lindsay
*Attorney, Agent, or Firm*—Ladas & Parry

[57] ABSTRACT

On shearing a melted glass stream flowing along a first direction at a first speed into a melted glass lump flowing along the first direction at a second speed faster than the first speed by a cutter section, the cutter section is closed and opened along the first direction and is also moved in a second direction substantially perpendicular to the first direction. While the cutter section is moved in the second direction, the motion of the cutter section is controlled at a third speed between the first speed and the second speed.

11 Claims, 4 Drawing Sheets

APPARATUS FOR PROCESSING A MELTED GLASS STREAM INTO A MELTED GLASS LUMP OF A PREDETERMINED VOLUME

BACKGROUND OF THE INVENTION

This invention relates to an apparatus for processing a melted glass stream into a melted glass lump of a predetermined volume.

On manufacturing a glass product, such as glass tableware, a glass bottle, an optical glass lens, or the like, it is necessary to cut a melted glass stream into a melted or fused glass lump of a predetermined volume and to introduce the melted glass lump into a die. The melted glass stream is discharged from a melting or fusion furnace and runs at a first speed in a first direction which may be, for example, in the direction of gravity, namely, a vertical direction. A cutting apparatus or a shear is generally used to cut such a melted glass stream into the melted glass lump.

A conventional cutting apparatus comprises a cutting section formed by first and second cutter portions or blades to cut the melted glass stream at predetermined intervals and a driving section for driving the first and the second cutter portions in a second or horizontal direction perpendicular to the first direction. The first and second cutter portions are moved in the horizontal direction to be repeatedly opened or closed. When the first and the second cutter portions are closed, the melted glass stream is cut into the melted glass lump of a predetermined volume. The melted glass lump falls down in the direction of gravity at a second speed faster than the first speed because no influence is exerted by the viscosity of the melted glass stream. The second speed may depend on gravitational acceleration. After closure of the first and the second cutter portions, the first and the second cutter portions are opened at the predetermined position. After lapse of a predetermined interval, the first and the second cutter portions are closed again to cut the melted glass stream into the melted glass lump of the predetermined volume. Each melted glass lump is introduced into the die and is processed into the glass product by press processing.

In the conventional cutting apparatus, cut chips inevitably remain on both the first cutter portion and the second cutter portion and are irregularly hardened on the first and the second cutter portions into a plurality of glass pieces after the above-mentioned cutting operation. Such irregular glass pieces are traced or transferred on a cut end of the melted glass lump in the form of an irregular cut mark. In addition, the glass pieces undesirably enter the melted glass lump. Such entering of the glass pieces into the melted glass lump gives rise to a plurality of bubbles in the melted glass lump. Cut marks and bubbles will be collectively called shear marks.

Accordingly, the shear marks should be removed after the glass product is manufactured. However, it is practically difficult to remove the shear marks from the glass product. This means that undesirable remnants are unavoidably left in the glass product due to the shear marks and reduce the quality of the glass product. At any rate, the use of the conventional cutting apparatus causes a damage to occur in the glass product and deteriorates the quality of the glass product.

SUMMARY OF THE INVENTION

It is an object of this invention to provide a cutting apparatus which is capable of preventing glass pieces from being mixed into a melted glass lump.

It is another object of this invention to provide a cutting apparatus which is capable of manufacturing a glass product of high quality.

An apparatus to which this invention is applicable is for processing a melted glass stream flowing along a first direction at a first speed into a melted glass lump flowing along the first direction at a second speed faster than the first speed and comprises cutter means for cutting the melted glass stream into the melted glass lump and driving means coupled to the cutting means for driving the cutter means to make the cutter means cut the melted glass stream. According to this invention, the driving means comprises a movement mechanism mechanically connected to the cutter means for selectively moving the cutter means in both the first direction and a second direction substantially perpendicular to the first direction and control means coupled to the movement mechanism for controlling the movement mechanism to selectively and successively move the cutter means through the movement mechanism in the second and the first directions, so that the cutter means cuts the melted glass stream into the melted glass lump during a movement of the cutter means in the second direction and is thereafter remote from the melted glass stream and the melted glass lump during a movement of the cutter means in the first direction.

DESCRIPTION OF THE PREFERRED EMBODIMENTS

Figure 1:
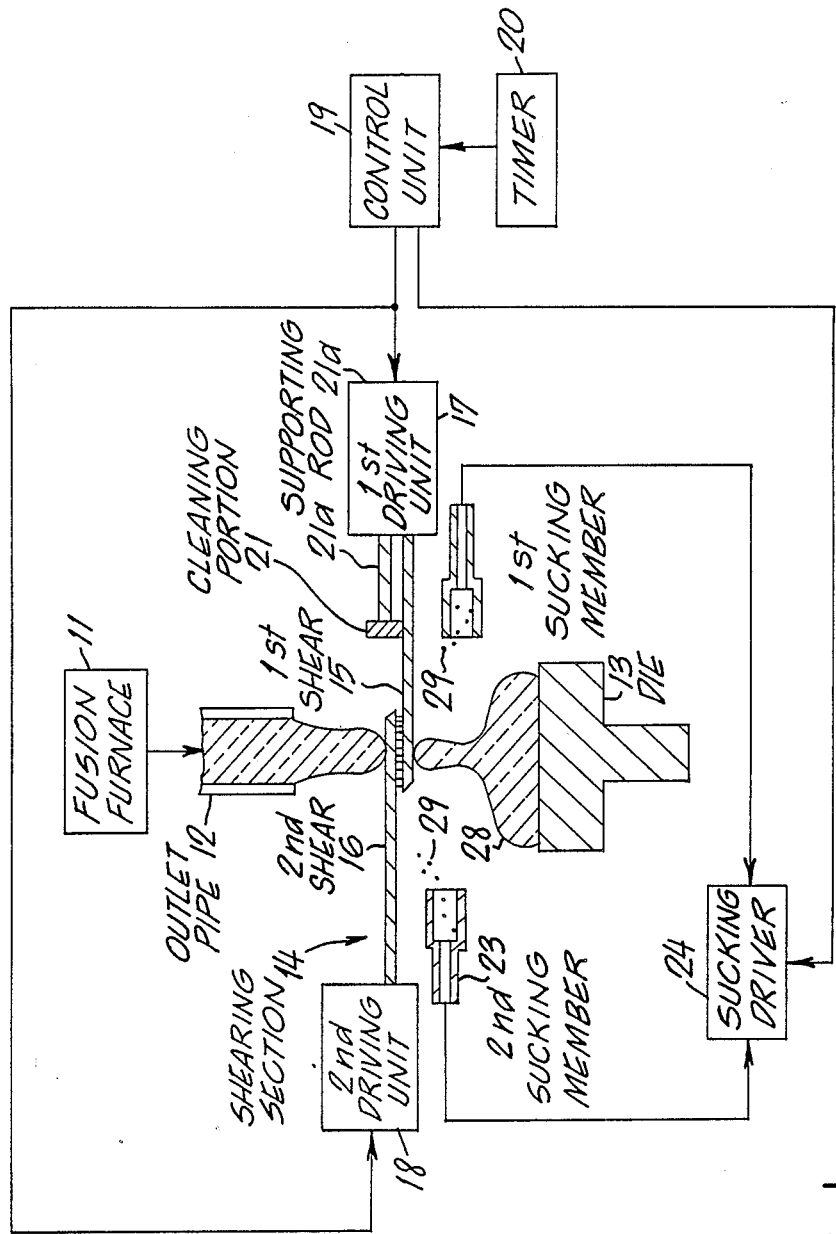
FIG. 1 is a cross sectional view of a shearing apparatus according to a first embodiment of this invention.

Referring to FIG. 1, a fusion furnace 11 is disposed upwards of FIG. 1 and has an outlet pipe 12 extending downwards of FIG. 1. The fusion furnace 11 stores an amount of melted glass. A die 13 is disposed just under the outlet pipe 12 and is, for example, of stainless steel. The melted glass is successively supplied from the fusion furnace 11 to the outlet pipe 12 to feed the melted glass as a melted glass stream from the lower end of outlet pipe 12. The melted glass stream flows downwards in FIG. 1 in the direction of gravity, namely, a vertical direction. The melted glass stream is processed into a melted glass lump to be fed to the die 13 in the form of the melted glass lump as described hereinafter.

A shearing apparatus according to a first embodiment of this invention comprises a shearing section 14 for shearing the melted glass stream into the melted glass lump. The shearing section 14 comprises first and second shears 15 and 16 which may be, for example, of tool steel. The first and the second shears 15 and 16 are arranged horizontally substantially perpendicular to the vertical direction and repeatedly carry out a reciprocating motion in a leftwards and rightwards in FIG. 1.

Figure 2:
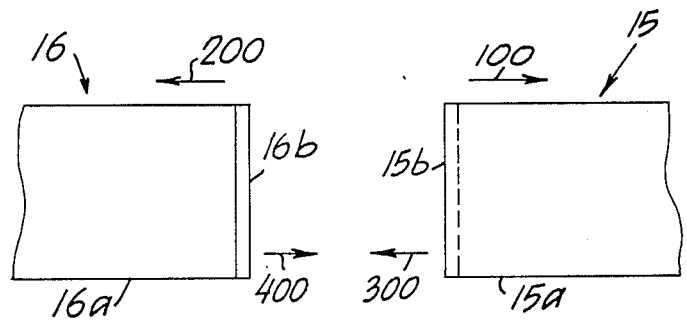
FIG. 2 is a plane view of one example of shears used in the shearing apparatus illustrated in FIG. 1.

As shown in FIG. 2, the first and the second shears 15 and 16 comprise main bodies 15a and 16a and blades 15b and 16b formed on edges of the main bodies 15a and 16a, respectively. The main bodies 15a and 16a are driven in the rightward and the leftward directions depicted at 100 and 200 to opened or waiting positions, respectively, and in the reverse directions depicted at 300 and 400 to closed or cutting positions. At the opened positions, the main bodies 15a and 16a are spaced apart with a predetermined distance left therebetween. The first and the second shears 15 and 16 having rectangular shapes may be used in case that the melted glass stream has 30 through 100 poises of viscosity coefficient and has a diameter equal to or smaller than 6 mm.

Figure 3:
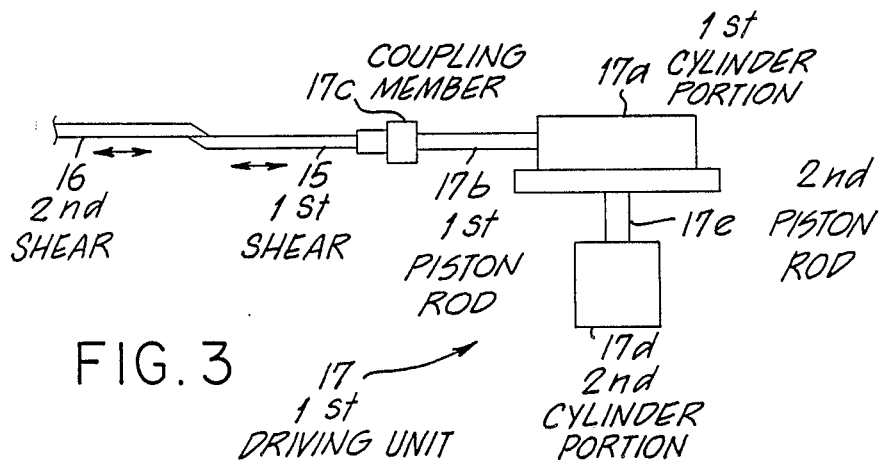
FIG. 3 is an elevational view of a driving mechanism used in the shearing apparatus illustrated in FIG. 1.

Referring to FIG. 3 together with FIG. 1, the first and the second shears 15 and 16 are coupled to first and second driving units 17 and 18 which are operable as a driving mechanism and which are similar in structure to each other. In this connection, the first driving unit 17 alone is illustrated in FIG. 3 with the second driving unit 18 omitted. The first and the second driving units 17 and 18 support the first and the second shears 15 and 16, respectively, and selectively drive the first and the second shears 15 and 16 in both the horizontal direction and the vertical direction in a manner to be described later.

In FIG. 3, the first driving unit 17 comprises a first cylinder portion 17a having a first piston rod 17b. The first piston rod 17b extends and contracts in the horizontal direction and is coupled to the first shear 15 through a first coupling member 17c. The first driving unit 17 comprises a second cylinder portion 17d formed by a second piston rod 17e extending and contracting in the vertical direction. The head of the second piston rod 17e is fixedly connected to the first cylinder portion 17a. The second driving unit 18 comprises parts similar to the first driving unit 17, as mentioned before.

As shown in FIG. 1, the first and the second driving units 17 and 18 are connected to a control unit 19 for controlling the first and the second driving units 17 and 18. The control unit 19 is connected to a timer 20 for timing or measuring a predetermined time duration to determine a predetermined volume of the melted glass lump. The first and the second driving units 17 and 18 and the control unit 19 serve as a driving section for driving the first and the second shears 15 and 16.

Further referring to FIG. 1, a cleaning portion 21, for example, of silicone rubber is slidably disposed on the upper surface of the first shear 15. The cleaning portion 21 is supported by a supporting rod 21a fixedly connected to the first driving unit 17. Therefore, the cleaning portion 21 moves together with the first shear 15 upwards and downwards in FIG. 1.

First and second sucking members 22 and 23 are disposed at positions adjacent to the first and the second shears 15 and 16, respectively. The positions of the first and the second sucking members 22 and 23 are selected so that the movement of the first and the second shears 15 and 16 not interrupted by the first and the second sucking members 22 and 23. The first and the second sucking members 22 and 23 are connected to a sucking driver 24 for driving the first and the second sucking members 22 and 23. The cleaning portion 21, the first and the second sucking members 22 and 23, and the sucking driver 24 may be collectively referred to as a cleaning unit.

In the meanwhile, the melted glass processed or cut by the shearing apparatus may be, for example, melted dense flint glass which has a specific gravity of 4.8 and which consists of 27.8 weight % of silicon dioxide ($SiO_2$), 1.8 weight % of sodium oxide ($Na_2O$), 1.2 weight % of potassium oxide ($K_2O$), 65.2 weight % of lead monoxide (PbO), 2.0 weight % of aluminum oxide ($Al_2O_3$), and 2.0 weight % of titanium dioxide ($TiO_2$). The melted glass stream descends at a stream speed slower than the free fall speed the since viscosity of the melted glass prevents the melted glass stream from being dropped at the free fall from the lower end of the outlet pipe 12. The stream speed of the melted glass stream may be, for example, 28 mm/second as it descends at the position of the shear apparatus. The stream speed may be called a first speed.

Figure 4:
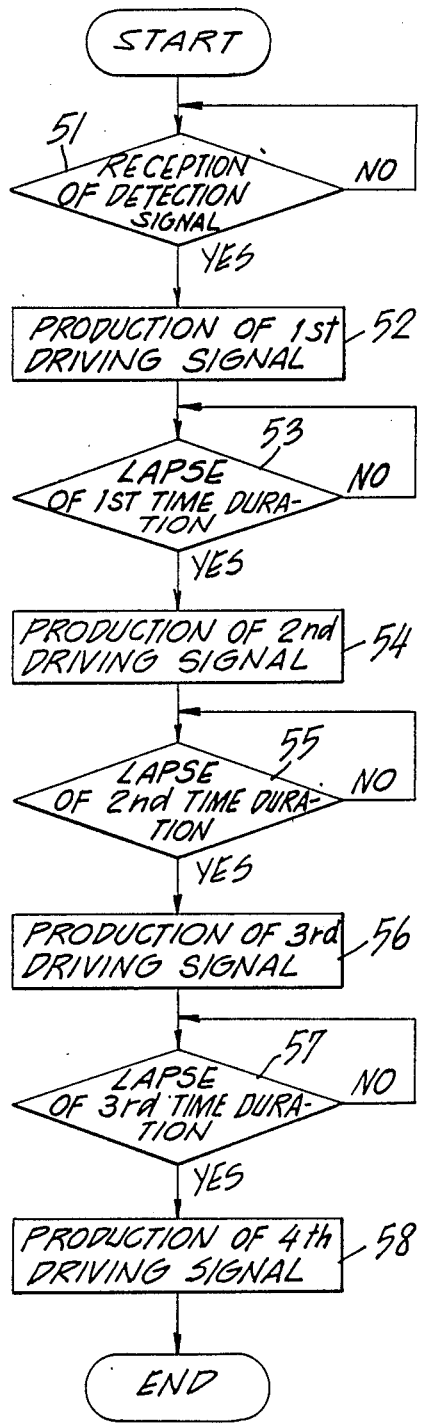
FIG. 4 is a flow chart for describing the operation of a control unit illustrated in FIG. 1.

Referring to FIG. 4 together with FIG. 1, the timer 20 is enabled to measure a predetermined time duration, although not shown in FIG. 4. The predetermined time duration is determined by a time interval during which the die 13 is filled with the melted glass. When the predetermined time duration lapses, the timer 20 supplies a detection signal to the control unit 19, as shown at a first step 51. The control unit 19 produces a first driving signal in response to the detection signal and delivers the first driving signal to the first and the second driving units 17 and 18, as shown at a second step 52. In FIG. 3, the first driving unit 17 drives the first cylinder portion 17a to move the first piston rod 17b in the leftward direction FIG. 1 in a horizontal direction. As a result, the first shear 15 is moved leftwards in FIG. 1. Similarly, the second shear 16 is moved towards the rightward sense of FIG. 1 by the second driving unit 18. The first and the second shears 15 and 16 reach the cutting positions to be put into a closed state and are kept in the closed state during a prescribed time duration, for example, 0.1 second. As a result, the melted glass stream is cut into the melted glass lump of a predetermined volume. Namely, the melted glass lump of the predetermined volume is dropped at a second speed dependent on free fall and fed to the die 13.

A slight gap is left between the first shear 15 and the second shear 16 in the closed state. Consequently, the melted glass which is in the gap is hardened into a plurality of glass pieces. Therefore, the glass pieces are dropped on the melted glass lump placed on the die 13 when the first and the second shears 15 and 16 are separated from each other.

In FIG. 4, the control unit 19 measures the first time duration at a third step 53 after delivery of the first driving signal to the first and the second driving units 17 and 18. When the first time duration lapses, the control unit 19 supplies a second driving signal to the first and the second driving units 17 and 18 at a fourth step 54. The first driving unit 17 drives the second cylinder portion 17d to move the second piston rod 17e downwards in FIG. 1 in response to the second driving signal. As a result, the first cylinder portion 17a is driven to downwardly move the first shear 15 downwards of FIG. 1. Similarly, the second driving unit 18 downwardly moves the second shear 16 in response to the second driving signal. In this case, the first and the second shears 15 and 16 are kept at the closed state during the prescribed time duration. After the prescribed time duration lapses, the first and the second shears 15 and 16 move downwards at a third speed which is intermediate the first speed and the second speed and which may be, for example, 200 mm/second. Therefore, the first and the second shears 15 and 16 are not in contact with the melted glass stream and the melted glass lump.

The first and the second shears 15 and 16 descend to a prescribed position which is spaced, for example, 3 mm downwards from the cutting position and are stopped at the prescribed position by the first and the second driving units 17 and 18.

After a second time duration for a downward movement of the distance of 3 mm as shown at a fifth step 55, the control unit 19 produces a third driving signal and supplies the first and the second driving units 17 and 18 with the third driving signal, as shown at a sixth step 56. The first driving unit 17 drives the first cylinder portion 17a to move the first piston rod 17b rightwards in FIG. 1. As a result, the first shear 15 moves to the right while the second driving unit 18 moves the second shear 16 to the left of FIG. 1. Thus, the first and the second shears 15 and 16 are opened to be retracted towards the waiting positions. Under these conditions, the control unit 19 drives the sucking unit 24.

When the first and the second shears 15 and 16 are separated from each other, the cleaning portion 21 sweeps the glass pieces on the upper surfaces of the first cutter portion 15. The glass pieces 29 are sucked into the first sucking member 22. Likewise, the glass pieces 29 left on the lower surface of the second shear 16 are sucked into the second sucking member 23.

After a third time duration lapses as shown at a seventh step 57 in FIG. 4, the control unit 19 produces a fourth driving signal at an eighth step 58 and supplies the first and the second driving units 17 and 18 with the fourth driving signal to move the first and the second shears 15 and 16 upwards. Namely, the first driving unit 17 drives the second cylinder portion 17d to move the second piston rod 17e upwards in FIG. 1. As result, the first cylinder portion 17a is moved upwards so that the first shear 15 moves upwards. Similarly, the second driving unit 18 moves the second shear 16 upwards. The first and the second shears 15 and 16 are returned to the waiting positions.

The die 13 travels leftwards in FIG. 1 together with the melted glass lump to carry out press processing. Thereafter, the melted glass lump is pressed into a glass product, such as glass tableware. Another die (not shown) is prepared from a rightward direction of FIG. 1 and is positioned under the outlet pipe 12. After the predetermined time duration is measured by the timer 20, the cutting process is carried out again in the similar manner described above. Namely, the control unit 19 produces the first driving signal and supplies the first and the second driving units 17 and 18 with the first driving signal.

Figure 5:
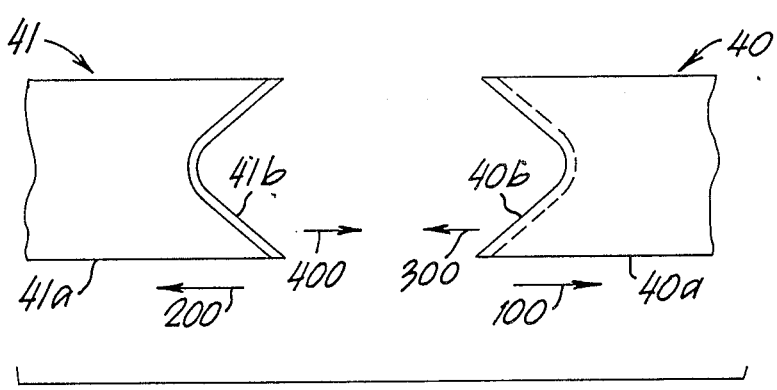
FIG. 5 is a plane view of another example of shears used in the shearing apparatus illustrated in FIG. 1.

Referring to FIG. 5, a pair of shears 40 and 41 may be used instead of the first and the second shears 15 and 16 illustrated in FIG. 2. The shears 40 and 41 have main bodies 40a and 41a and blades 40b and 41b formed on edges of the main bodies 40a and 41a, respectively. Each of blades 40b and 41b has a V-shaped form having an arcuate portion specified by a predetermined radius at a center portion of each blade 40b and 41b. Specifically, each blade 40b and 41b has the shape of a rounded V. The predetermined radius is approximately equal to a radius of the melted glass stream. The shears 40 and 41 are able to shear a melted glass stream with 30 through 1500 poises of viscosity coefficient.

The shears 40 and 41 are driven in a manner similar to the driving operation of the first and the second shears 15 and 16 illustrated in FIG. 2. Namely, the shears 40 and 41 are driven in the rightward and the leftward directions depicted at 100 and 200 to opened positions, respectively, and in reverse directions depicted at 300 and 400 to closed positions.

Figure 6:
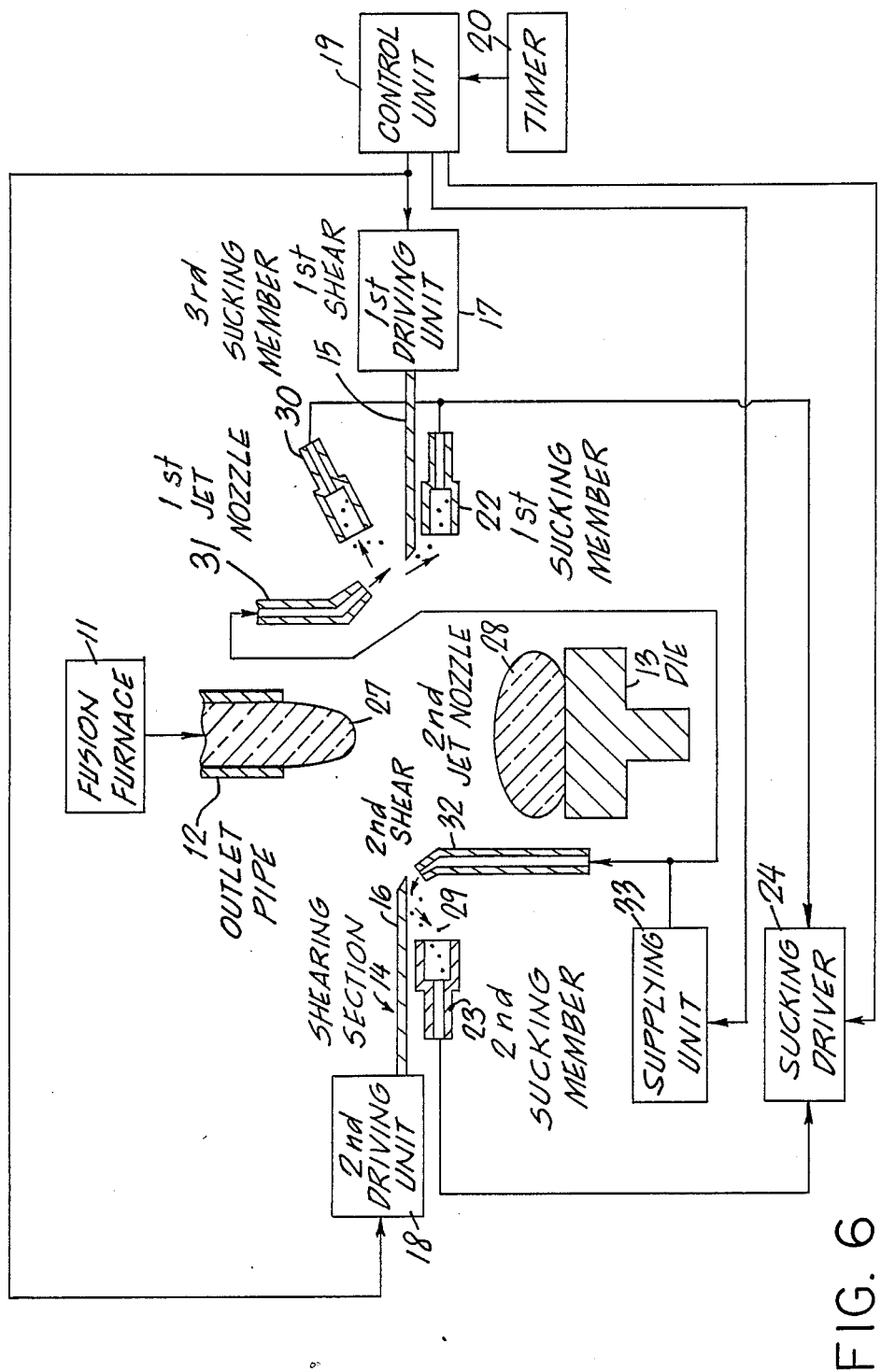
FIG. 6 is a cross sectional view of a shearing apparatus according to a second embodiment of this invention.

Referring to FIG. 6, description will be made as regards a second embodiment of this invention. In FIG. 6, a shearing apparatus according to a second embodiment of this invention is similar in structure and operation to that illustrated in FIG. 1 except that the cleaning portion 21 is omitted from FIG. 6. The shearing apparatus further comprises a third sucking member 30 connected to the sucking driver 24, first and second jet nozzles 31 and 32 for discharging a fluid such as air, a mixture of air and liquid, or the like, and a supplying unit 33 for supplying the fluid to the first and the second jet nozzles 31 and 32. Inert gases can be used as the fluid instead of air. Furthermore, water or a surface active agent is used as the liquid. The third sucking member 30 is disposed above the upper surface of the first shear 15. The first jet nozzles 31 is disposed above the upper surface of the first shear 15. The second jet nozzle 32 is disposed under the lower surface of the second shear 16.

As in the first embodiment, the first and the second shears 15 and 16 move to the prescribed position after shearing the melted glass stream 27 into the melted glass lump 28. When the first and the second shears 15 and 16 are pulled apart from each other, the sucking driver 24 is driven by the control unit 19 to suck the glass pieces on the first and the second shears 15 and 16 into the first, the second, and the third sucking members 22, 23, and 30, respectively.

After the first and the second shears 15 and 16 have been separated, the control unit 19 drives the supplying unit 33. As a result, the supplying unit 33 supplies the fluid to the first and the second jet nozzles 31 and 32 during a prescribed time duration. The first and the second discharge nozzles 31 and 32 jet the fluid as jets to blow the glass pieces away from the first and the second shears 15 and 16, respectively. The glass pieces are sucked into the first, the second, and the third sucking members 22, 23, and 30, respectively. Namely, the glass pieces are removed from the first and the second shears 15 and 16. The first and the second shears 15 and 16 are returned to the waiting position by the first and the second driving units 17 and 18.

While this invention has been described in conjunction with preferred embodiments thereof, it will readily be possible for those skilled in the art to put this invention into practice in various other manners. For example, the first and the second shears may be partially moved in the vertical direction. Furthermore, the cleaning portion can be disposed on the upper surface of the first shears before the first and the second shears are separated. The die may be made of stainless steel, a heat resistant steel, nickel, ceramics or the like. The cleaning portion may be made of a heat resistant and flexible material instead of silicone rubber.

What is claimed is:

1. In an apparatus for processing a melted glass stream flowing in a first direction at a first speed into a melted glass lump flowing in said first direction at a second speed faster than said first speed, said apparatus comprising first and second shears arranged in a second direction substantially perpendicular to said first direction for cutting said melted glass stream into said melted glass lump and driving means coupled to said first and said second shears for driving said first and second shears, the improvement wherein said driving means comprises:

a movement mechanism mechanically connected to said first and said second shears for selectively moving said first and said second shears in both said first direction and said second direction; and control means coupled to said movement mechanism for controlling said movement mechanism to selectively and successively move said first and said second shears through said movement mechanism in said second and said first directions;

said control means comprising;

first means for controlling said movement mechanism to move said first and said second shears in said second direction at a predetermined position in said first direction to thereby close said first and said second shears;

second means for controlling said movement mechanism to move said first and second shears from said predetermined position to a prescribed position positioned downstream relative to said predetermined position in said first direction at a third speed between said first speed and said second speed after said first and said second shears are closed;

third means for controlling said movement mechanism to open said first and said second shears at said prescribed position in said second direction after said first and said second shears have been moved from said predetermined position to said prescribed position; and fourth means for controlling said movement mechanism to return said first and said second shears back from said prescribed position to said predetermined position in said first direction after said first and said second shears are opened.

2. An apparatus as claimed in claim 1, wherein said movement mechanism comprises:

a first driving unit for driving said first shear in said first and said second directions; and a second driving unit for driving said second shear in said first and said second directions.

3. An apparatus as claimed in claim 1, wherein said control means further comprises:

detecting means for detecting a predetermined interval to produce a detection signal when said predetermined interval lapses, and supply means for supplying said first means with said detection signal;

said first means being responsive to said detection signal for controlling said movement mechanism.

4. An apparatus as claimed in claim 1, wherein said apparatus further comprises:

cleaning means for cleaning said shears; and first drive means for driving said cleaning means to clean said shears after said shears are separated from each other.

5. An apparatus as claimed in claim 1, each of said shears having a main body and a blade formed on the edge of said main body, wherein said blade has a predetermined shape having an arcuate portion specified by a predetermined radius.

6. An apparatus as claimed in claim 2, wherein said first driving unit comprises:

a first rod portion coupled to said first shear and extending in said second direction;

a first driving part coupled to said first rod portion for driving said first rod portion in said second direction;

a second rod portion coupled to said first driving part and extending in said first direction; and a second driving part coupled to said second rod portion for driving said second rod portion in said first direction;

said second driving unit comprising:

a third rod portion coupled to said second shear and extending in said second direction;

a third driving part coupled to said third rod portion for driving said third rod portion in said second direction;

a fourth rod portion coupled to said third driving part and extending in said first direction; and a fourth driving part coupled to said fourth rod portion for driving said fourth rod portion in said first direction.

7. An apparatus as claimed in claim 3, wherein said first through said fourth means are operated in the order of said first through said fourth means when said control means receives said detection signal from said supply means.

8. An apparatus as claimed in claim 4, wherein said cleaning means comprises:

a cleaning portion slidably disposed on one surface of one of said shears and moved together with one of said shears in said first direction; and sucking means disposed at a position adjacent to said prescribed position for sucking remnant glass pieces on said first and said second shears.

9. An apparatus as claimed in claim 4, wherein said cleaning means comprises:

a cleaning potion slidably moved on one of said shears; and second drive means for driving said cleaning portion to position said cleaning portion on one of said shears after said shears are moved to said prescribed position.

10. An apparatus as claimed in claim 4, wherein said cleaning means comprises:

blowing means for blowing a fluid onto said shears to remove remnant glass pieces on said shears; and sucking means disposed at a position adjacent to said prescribed position for sucking said remnant glass.

11. An apparatus as claimed in claim 5, wherein said predetermined radius is substantially equal to the radius of the melted glass stream.

* * * * *